United States Patent
Krieg

(10) Patent No.: US 7,853,155 B2
(45) Date of Patent: *Dec. 14, 2010

(54) METHOD FOR ADJUSTING BIAS IN OPTICAL TRANSMITTER WITH EXTERNAL MODULATOR

(75) Inventor: Eric Krieg, Maple Glen, PA (US)

(73) Assignee: Emcore Corporation, Albuquerque, NM (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/301,215

(22) Filed: Dec. 12, 2005

(65) Prior Publication Data

US 2007/0134006 A1    Jun. 14, 2007

(51) Int. Cl.
*H04B 10/04* (2006.01)

(52) U.S. Cl. .................. 398/198; 398/183; 398/195; 385/1; 385/2; 385/3; 359/245; 359/237; 372/28; 372/29.01

(58) Field of Classification Search .............. 385/1, 385/2, 3, 122; 359/245, 248, 237; 372/28, 372/29.01, 21; 398/182, 183, 185, 186, 187, 398/188, 192, 193, 194, 195, 196, 197, 198, 398/158, 159, 81, 33, 32, 30, 31, 36
See application file for complete search history.

(56) References Cited

U.S. PATENT DOCUMENTS

| | | | |
|---|---|---|---|
| 5,003,624 A | 3/1991 | Terbrack et al. | |
| 5,148,503 A | 9/1992 | Skeie | |
| 5,249,243 A | 9/1993 | Skeie | |
| 5,278,923 A | 1/1994 | Nazarathy et al. | |
| 5,321,543 A * | 6/1994 | Huber | 398/194 |
| 5,850,305 A * | 12/1998 | Pidgeon | 398/193 |
| 5,900,621 A | 5/1999 | Nagakubo et al. | |
| 6,046,838 A | 4/2000 | Kou et al. | |
| 6,163,395 A * | 12/2000 | Nemecek et al. | 398/198 |
| 6,204,951 B1 * | 3/2001 | Coward et al. | 359/245 |
| 6,239,897 B1 * | 5/2001 | Jackson | 359/245 |
| 6,282,003 B1 | 8/2001 | Logan, Jr. et al. | |
| 6,317,247 B1 | 11/2001 | Yang et al. | |
| 6,449,080 B1 | 9/2002 | McBrien et al. | |
| 6,479,979 B1 | 11/2002 | Kingsley et al. | |
| 6,483,953 B1 | 11/2002 | McBrien et al. | |
| 6,490,071 B2 | 12/2002 | Logan, Jr. et al. | |
| 6,510,255 B2 * | 1/2003 | Masuda et al. | 385/2 |
| 6,580,544 B1 | 6/2003 | Lin et al. | |
| 6,687,451 B1 * | 2/2004 | Sikora | 398/187 |
| 6,687,466 B1 * | 2/2004 | Chiappetta | 398/193 |
| 6,842,587 B1 | 1/2005 | McGhan et al. | |
| 6,879,422 B2 | 4/2005 | Notargiacomo et al. | |
| 6,917,455 B2 | 7/2005 | McBrien et al. | |
| 6,941,077 B2 | 9/2005 | Aronson et al. | |
| 6,961,166 B2 | 11/2005 | Wooten et al. | |
| 7,463,802 B2 * | 12/2008 | Witzel | 385/100 |
| 2006/0127103 A1 | 6/2006 | Mazurczyk et al. | |
| 2006/0210210 A1 * | 9/2006 | Webb et al. | 385/1 |
| 2007/0019968 A1 * | 1/2007 | Hashimoto et al. | 398/198 |

* cited by examiner

*Primary Examiner*—Hanh Phan

(57) ABSTRACT

A method for operating an optical transmitter for transmission of an optical signal over a dispersive fiber optic media to a remote receiver. The method includes the steps of providing a respective bias level of a first RF signal and a second RF signal input to an optical modulator that modulates the optical signal; determining an output level of the optical modulator in response to the provided bias levels and adjusting a bias level of at least one of the first and second RF input signals based upon the determined output level and an expected output level at a configuration set point for the provided respective bias levels.

10 Claims, 4 Drawing Sheets

METHOD FOR ADJUSTING BIAS IN OPTICAL TRANSMITTER WITH EXTERNAL MODULATOR

REFERENCE TO RELATED APPLICATIONS

This application is related to U.S. patent application Ser. No. 11/258,732 filed Oct. 25, 2005, and assigned to the common assignee.

BACKGROUND OF THE INVENTION

1. Field of the Invention

This invention relates to optical transmitters for analog RF signals, and in particular to externally modulated solid state lasers. More particularly, the invention relates to the use of a programmed processor coupled to the external modulator of the laser for continuously adjusting the bias of the two RF inputs to minimize composite second order beat (CSO) distortion.

2. Description of the Related Art

Modulating the analog intensity of the optical signal from a light-emitting diode (LED) or semiconductor laser with an electrical signal is known in the art for transmitting analog signals such as sound and video signals, on optical fibers. Although such analog techniques have the advantage of significantly smaller bandwidth requirements than digital pulse code modulation, or analog or pulse frequency modulation, amplitude modulation puts stringent requirements on the noise and nonlinearity associated with the optical source.

For that reason, direct modulation of the laser has been used in connection with 1310 nm lasers where the application is to short transmission links that employ fiber optic links with zero dispersion. For applications in metro and long haul fiber transmission links the low loss of the link requires that externally modulated 1550 nm lasers be used, but such external modulation techniques are more complex mixture of the number and type RF channels, with modulation types ranging from analog to QAM. The present invention is therefore addressed to the problem of providing a software algorithm for simultaneously adjusting the bias of the two RF inputs of the external modulator so that the optical output signal can be used in single mode fiber used in metro and long haul optical networks.

SUMMARY OF THE INVENTION

The present application includes methods of operating an optical transmitter for transmission of an optical signal over a dispersive fiber optic media to a remote receiver. One method includes providing an initial bias level of a first RF signal and a second RF signal respectively to the optical modulator for modulating the optical signal. The amplitude of the optical signal output of the optical modulator operating at the provided initial bias levels is determined, and the bias level of at least one of the first and second RF signals is adjusted based upon the determined output level and an expected output level at a configuration set point for the respective initial bias levels. The expected output level from a lookup table based upon the provided respective bias levels is determined. Adjusting the bias levels uses a first software program sequence for making coarse bias adjustment on start up of the optical transmitter, and uses a second software program sequence for making a fine bias adjustment. The method includes adjusting the bias level of only one of the RF signals during the first program sequence, and incrementing the bias level of the RF signal during the first program sequence and averaging the output level of the modulator over a program controlled time period. The method includes determining whether the first RF input signal should be incremented or decremented based upon the change in the output level of the optical modulator as a result of incrementing the first RF input signal. When the lookup table indicates the first RF signal is to be incremented, the method includes incrementing the first RF signal by a computed delta value and comparing a resulting output to a first threshold value. When the lookup table indicates that the first RF signal is to be decremented, then decrementing the first RF signal by the delta value until a subsequently averaged output signal exceeds the first threshold value. The method also includes determining when the subsequently averaged output signal exceeds the first threshold value then activating the second program sequence for more finely adjusting the bias level of both RF1 and RF2. Further, the method includes adjusting the bias level of the first RF signal during the second program sequence if a current output value $T_i$ is greater than an immediately previous value $T_{i-1}$ or an immediately subsequent output value $T_{i+1}$ is greater than the current output value $T_i$ or if an absolute value of a difference between the second program sequence threshold value and current sample value is greater than an absolute value of a difference between the second program sequence threshold value and the subsequent sample value $T_{i+1}$. The method includes adjusting the bias level of the second RF signal during the second program sequence if a current output value $T_i$ is less than an immediately previous value $T_{i-1}$ or an immediately subsequent output value $T_{i+1}$ is greater than the current output value $T_i$ or if an absolute value of a difference between the second program sequence threshold value and current sample value is less than an absolute value of a difference between the second program sequence threshold value and subsequent sample value $T_{i+1}$.

Another method of operating an optical transmitter for transmission of an optical signal over a dispersive fiber optic media to a remote receiver includes sampling an output optical signal from a modulator of the optical signal within the transmitter at periodic intervals and converting the output optical signals into a digital signal. The method also includes averaging the digital output signal over a predetermined time interval, and incrementing an amplitude of a first RF input signal of the modulator by a delta value. The method includes waiting until the sampled averaged output digital signal stabilizes to a relatively constant value and determining whether the first RF signal should be incremented or decremented based upon the stabilized output signal and incremented first RF input signal. When an algorithm indicates that the first RF input signal is to be incremented or decremented, then incrementing or decrementing the first RF input signal by a delta value until a subsequently sampled averaged stabilized output signal exceeds a first threshold value. The method may also include periodically selecting one of the first RF value and a second RF input to the modulator for making a bias value change by comparing the output value of the modulator with a threshold value.

The application also includes an optical transmitter for transmission of an optical signal over a dispersive fiber optic media to a remote receiver. The optical transmitter includes a modulator that modulates the optical signal with a first RF signal provided through a first RF signal input and with a second RF signal provided through a second RF input, a respective bias level of the first RF signal and the second RF signal that is provided to the optical modulator through the respective first and second RF signal inputs, a photodiode that detects an output level of the optical modulator in response to the provided bias levels, and a program that adjusts a bias level of at least one of the first and second RF input signals based upon the determined output level and an expected output level at a configuration set point for the provided respective bias levels. The optical transmitter may further include a first program that provides a first coarse bias level adjustment to a configuration set point and a second program that provides a final fine tuning bias level adjustment to the configuration set point.

It is an object of the present invention to provide an improved optical transmission system using externally modulated lasers.

It is another object of the present invention to provide a method for biasing the laser in a 1550 nm analog optical transmission system utilizing two cascade or series connected modulators.

It is also another object of the present invention to provide a software algorithm in a microcontroller to independently and simultaneously adjust the bias of an external modulator used in a 1550 nm analog or QAM optical transmission system for broadband RF.

It is still another object of the present invention to provide an adaptive system for adjusting the DC bias and pilot tones of linear analog optical transmission systems suitable for long haul dispersive optical fiber media.

It is still another object of the present invention to provide a real time digital signal processor control circuit for controlling the optical characteristics of the optical signal from an externally modulated laser.

Some implementations or embodiments may achieve fewer than all of the foregoing objects.

Briefly, and in general terms, the present invention provides an optical transmitter for generating a modulated optical signal for transmission over a fiber optic link to a remote receiver comprising a semiconductor laser for reproducing an optical signal; an external modulator for modulating the optical signal with a broadband analog radio frequency (RF) signal; and bias adjustment means connected to the input of the external modulator for adapting the modulation characteristics of the external modulator to minimize distortion in the received signal at the remote receiver.

In another aspect, the present invention provides an optical transmitter for generating a modulated optical signal for transmission over a dispersive fiber optic link to a remote receiver having an input for receiving a broadband radio frequency signal input; a semiconductor laser for producing an optical signal to be transmitted over an optical fiber; and an external modulator for modulating the optical signal with the analog signal including first and second RF inputs. A predistortion circuit is coupled to the second RF input for reducing the distortion in the signal present at the receiver end of the fiber optic link.

In another aspect, the present invention provides an optical signal output from the modulator which causes the received signal at the other end of the transmission system to compensate for the effect of composite second order (CSO) distortion generated in the dispersive optical fiber link, which results in noise in the received signal and unacceptable quality in the demodulated RF signal for standard AM modulated broadcast CATV channels.

Some implementations or embodiments may incorporate or implement fewer of the aspects or features noted in the foregoing summaries.

DESCRIPTION OF THE PREFERRED EMBODIMENT

Figure 1:
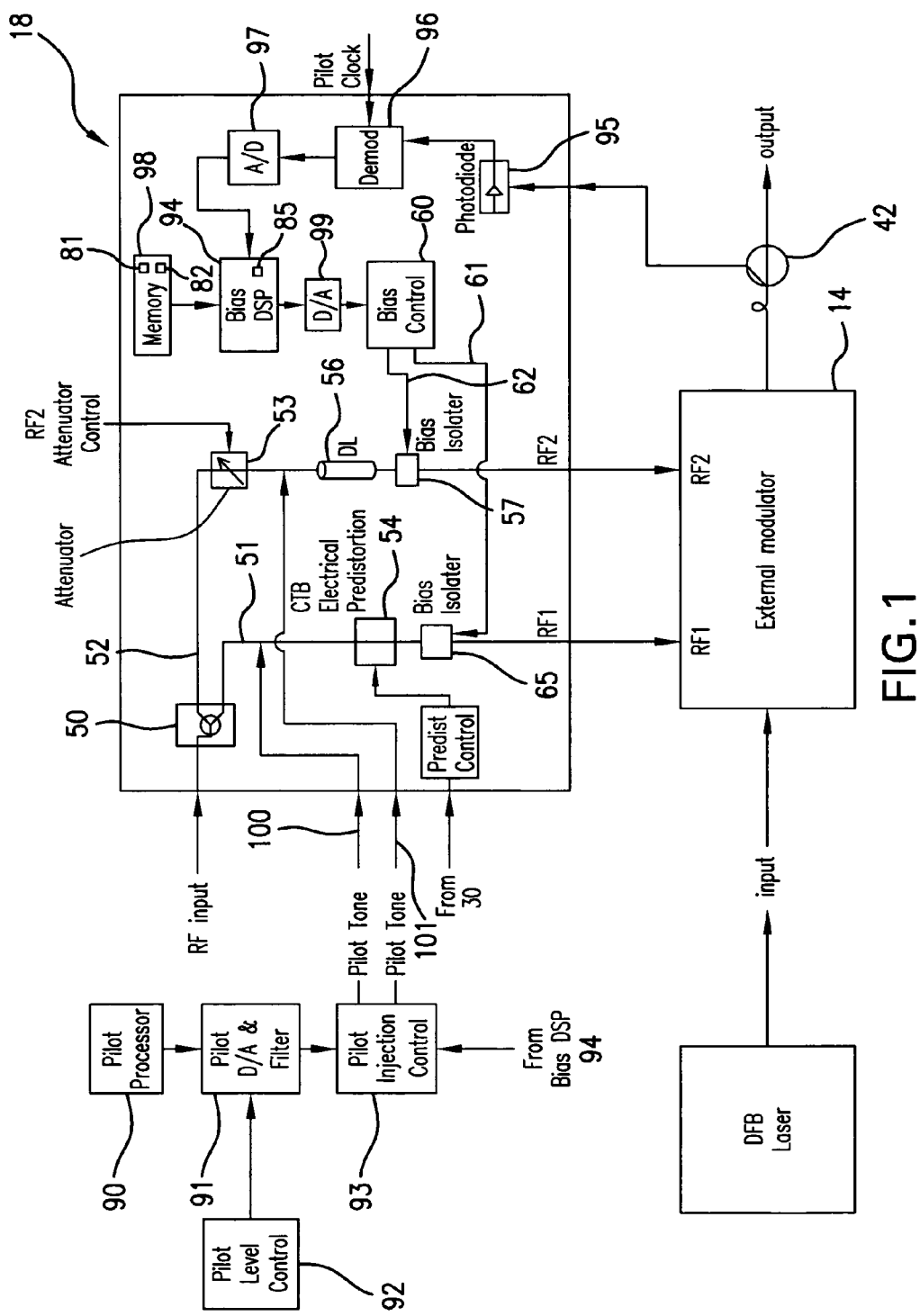
FIG. 1 is a block diagram of a portion of an optical transmitter for generating a modulated optical signal in accordance with an illustrated embodiment of the invention.

Details of the present invention will now be described, including exemplary aspects and embodiments thereof. Referring to the drawing and the following description, like reference numbers are used to identify like or functionally similar elements, and are intended to illustrate major features of exemplary embodiments in a highly simplified diagrammatic manner. Moreover, the drawings are not intended to depict every feature of actual embodiment nor the relative dimension of the depicted elements, and are not drawn to scale.

The present invention is directed to a software algorithm optical transmitter for generating a modulated optical signal for transmission over dispersive fiber optic links in which a broadband radio frequency signal input is applied to first and second RF inputs of an external modulator for modulating the output of a semiconductor laser. The transmitter includes a digital signal processor coupled to the output of the modulator for continuously sampling and monitoring the output and independently and simultaneously adjusting the DC bias of the first and second RF inputs to minimize an error signal characteristic of the optical signal, that is characteristic of or an indicator of the noise associated with composite second order (CSO) distortion of the received signal at a remote receiver.

Turning to FIG. 1, there is shown a simplified block diagram of a portion of an optical transmitter in an embodiment of the invention. The transmitter includes a laser assembly (e.g., a DFB laser diode) 12 and an external modulator 14. The external modulator 14 modulates the CW output of the laser 12 with an information-containing pair of radio frequency signals (RF1, RF2), which are applied from a CSO demodulation and bias controller (modulation controller) 18. A typical transmitter is depicted in U.S. patent application Ser. No. 11/258,732, incorporated herein by reference.

The modulation controller 18 includes a programmed digital signal processor 93 that adjusts the bias of the RF signal inputs so that the composite triple beat (CTB) and composite second order beat (CSO) performance over a frequency range of 40 to 800 MHz is optimized, which is important for the application of the transmitter as a central office transmitter for the transmission of CATV carriers and QAM signals in the frequency range of up to 870 MHz. The transmitter may typically be used to transmit any combination of up to 112 carriers (e.g. 6 MHz channels) and QAM signals up to 870 MHz.

Turning now to the optical signal, the laser 12 provides optical signals at a wavelength of either 1545+/−1 nm, 1555+/−5 nm, or odd ITU channels 21 through 29, depending upon the application. The optical output of the laser 12 is coupled to the input of the modulator.

The external modulator 14 in the preferred embodiment consists of two series connected stages, each with a distinct RF input, labeled RF1 and RF2 respectively. The output of the second stage of the modulator is coupled to an optical fiber, which is coupled to a pigtail or optical connector which permits the transmission fiber optic link to be connected. A tap 42 is provided on the output to allow the output signal to be sampled. The sampled signal is coupled into a photodetector, which converts the optical signal into an electrical signal for processing. The sampled signal is used to set an operating point of the modulator 14 through output RF2 for purposes of controlling CSO performance.

The RF input from the post amplifier of the optical transmitter is applied to a signal splitter 50 which creates two RF channels 51 and 52. A first pilot tone is applied to the RF channel 51 from the pilot tone line 100. The signal on the first RF channel 51 is then applied to a CTB electrical predistortion circuit 54, for the purpose of reducing the CTB distortion at the receiver end of the optical fiber link. The DC level on the first RF channel 51 is controlled by a bias control unit 60, which sends an analog bias level to bias isolator 55 which couples the bias level to the RF channel 51, which is then applied to the first RF input, RFI, on the external modulator 14.

The signal on the second RF channel 52 is applied to an attenuator 53, which is controlled from the digital signal processor 94. A second pilot tone is then applied to the output of the attenuator 53 from the pilot tone line 101. The combined signal is then applied to a delay line (DL) 56.

The DC level on the second RF channel 52 is controlled by a bias control unit 60, which sends an analog bias level to bias isolator 57 which couples the bias level to the RF channel 52, which is then applied to the second RF input, RF2, on the external modulator.

The pilot tones to be applied to the modulator are generated by a pilot processor 90, which produces a digital signal that is applied to a digital to analog converter and filter 91. The output of the pilot D/A and filter 91 is then applied to a pilot level control unit 92, which sets the analog level. The pilot signal is then applied to a switch 93, which is controlled by the bias digital signal processor (DSP) 93. The switch 93 then switches the pilot tone to either line 100 or line 101, or both.

The bias DSP 93 functions to adjust the modulator bias based upon measurements from the output optical signal.

The digital signal processor 83 is coupled to the output of the modulator for independently adjusting the DC bias of the first and second RF inputs to control a characteristic of the optical signal, such as noise associated with composite second order (CSO) distortion at a remote receiver.

As shown in FIG. 1, the output of the external modulator is tapped and coupled to a photo detector 95 which converts the optical signal into an electric signal. The electric signal is applied to a demodulator 96 along with a pilot clock signal. The demodulated analog RF signal is then applied to an analog to digital converter 97, which provides a digital representation of the RF signal to the bias DSP 94. A memory 98 is also associated with the bias DSP 94 for storing data.

The electrical signal is converted by an analog-to-digital converter into a digital signal, which is applied to a digital signal processor or microcontroller to allow the output to be continuously sampled and adjustments made on a real time basis.

The output of the digital signal processor is applied to control the DC bias component of the respective RF signals applied to the first and second RF inputs of the modulator RF1 and RF2.

The applied electrical signals have three components—a DC bias level, a pilot tone, and the applied RF information signal which modulates the laser beam and conveys the data or video signal to the remote receiver. The digital signal processor uses an algorithm, to be subsequently described, to set the appropriate DC bias level as a result of measurements on the optical signal will vary with time and temperatures, so the output signal must be continuously monitored during operation and adjustments made to the DC bias levels.

Figure 2A:
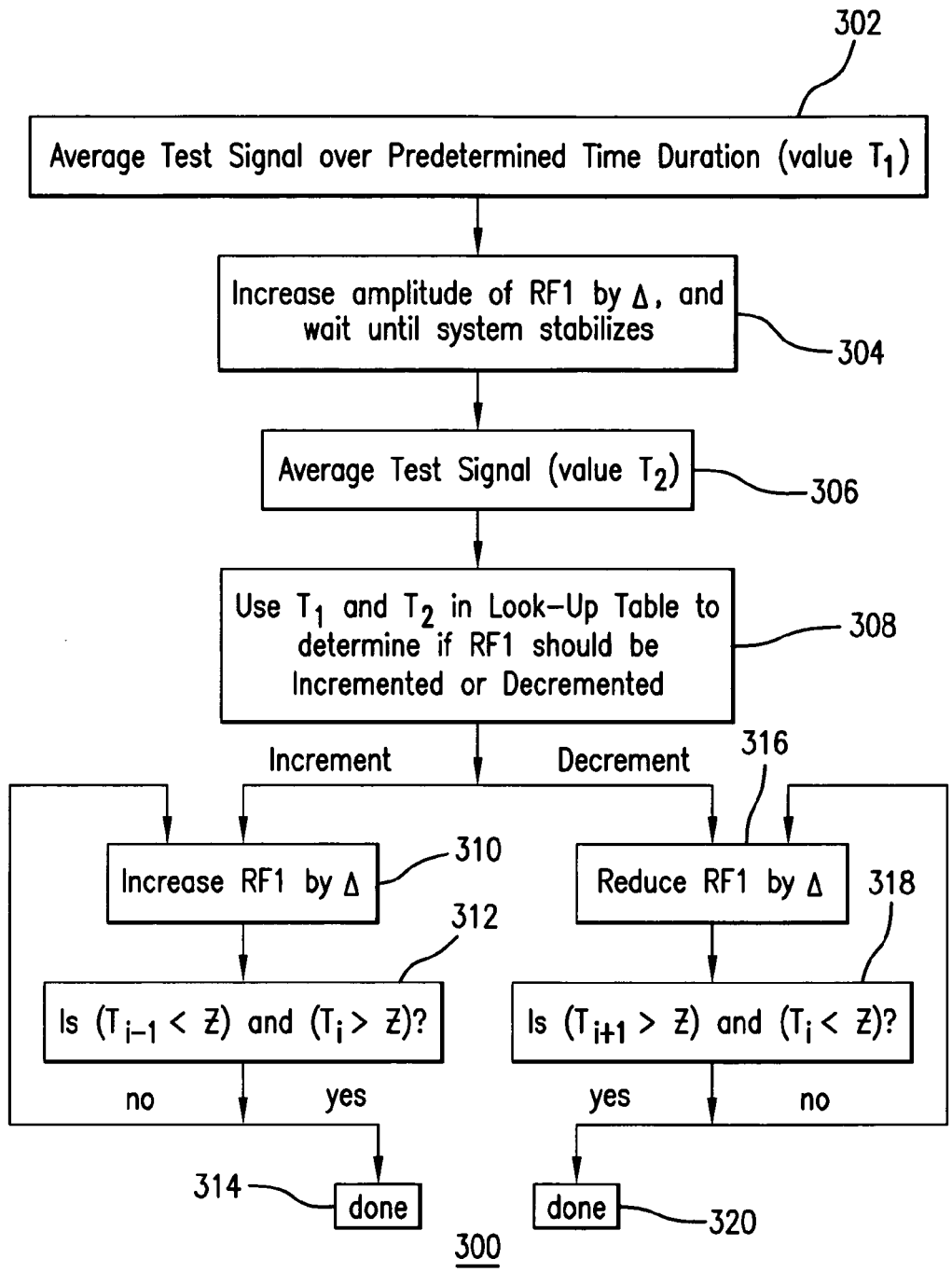
FIGS. 2A and 2B are flowcharts of a process for operating the modulator bias controller in the transmitter of FIG. 1 according to the coarse tuning aspect of the present invention.
Figure 2B:
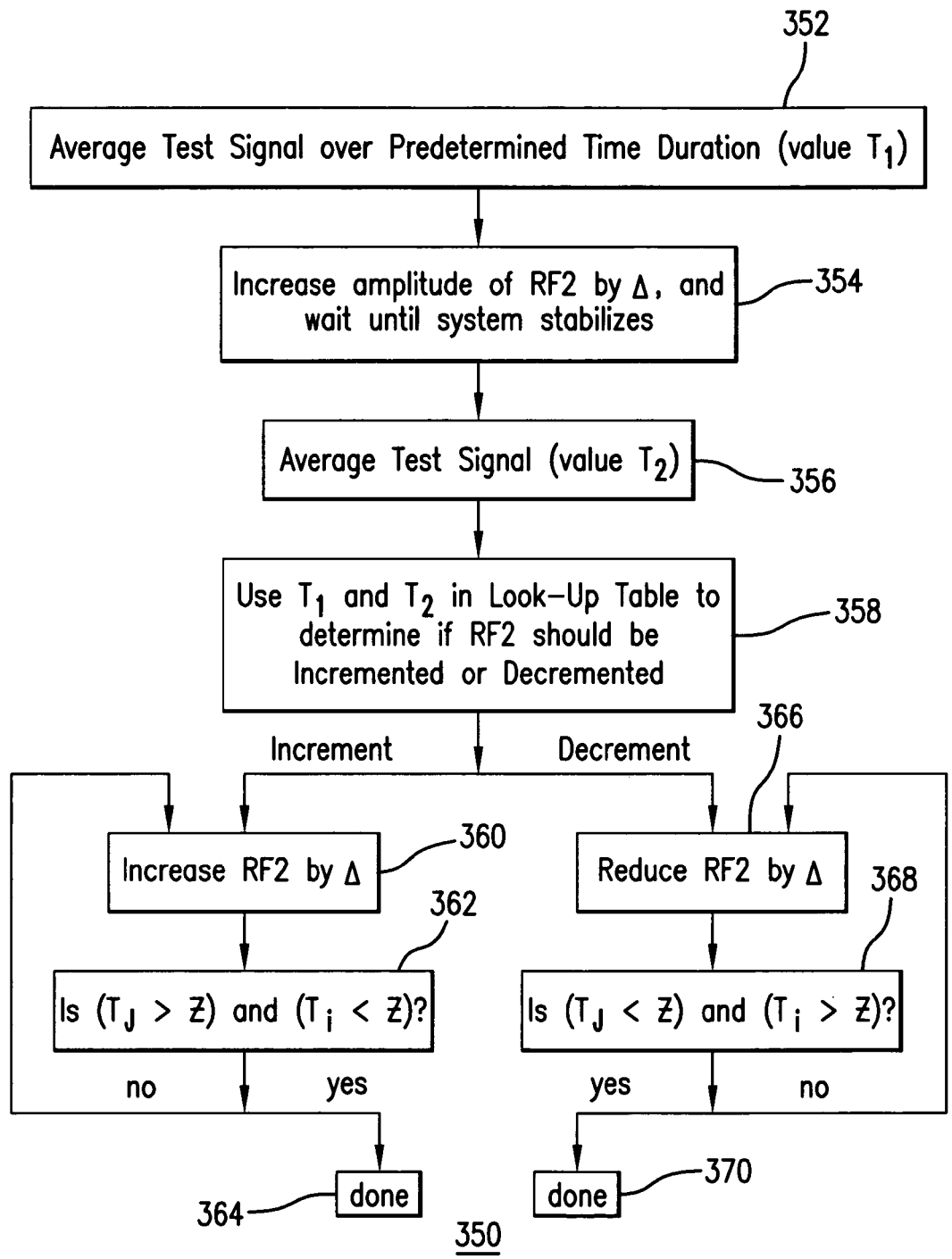
Figure 3:
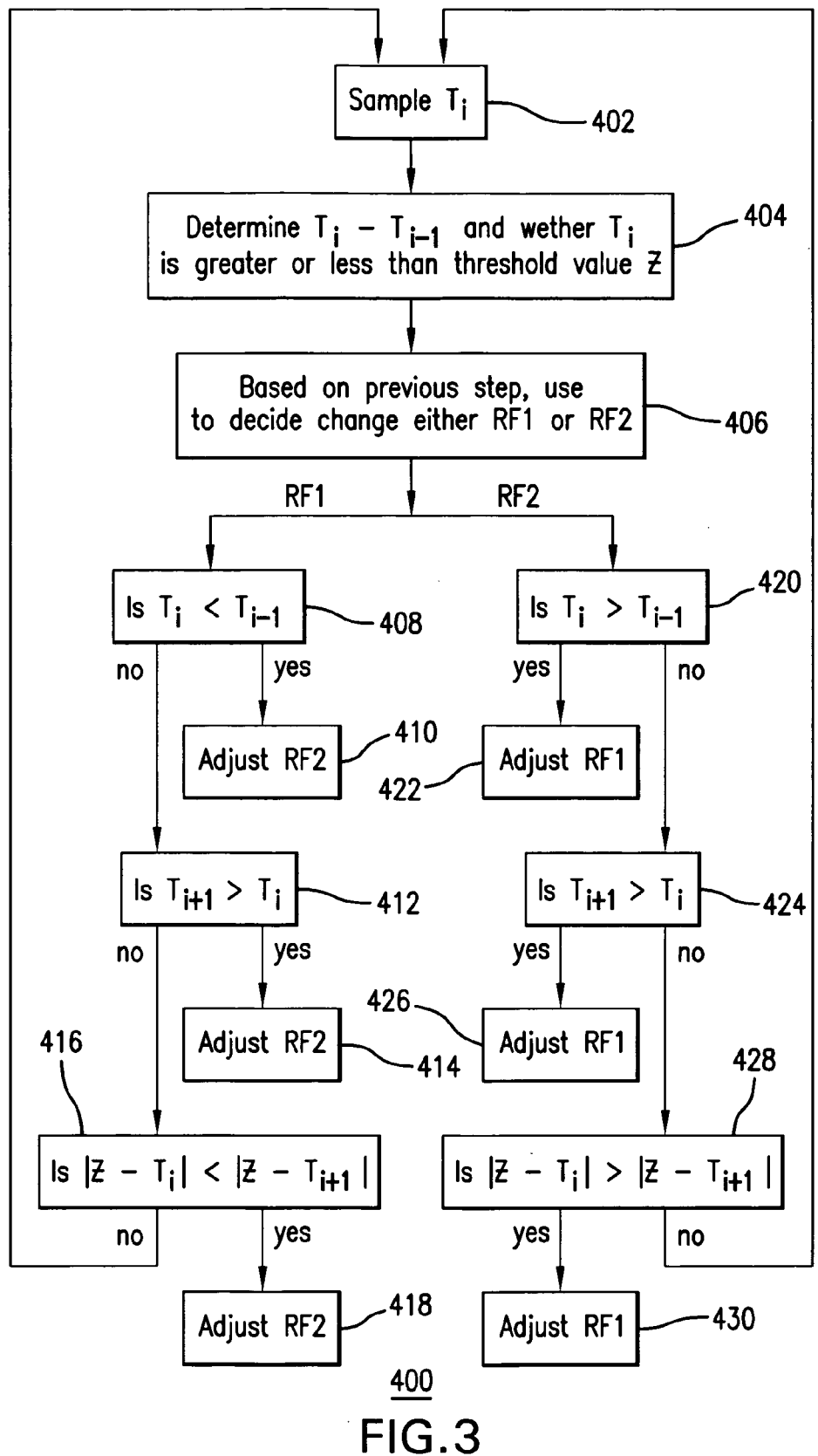
FIG. 3 is a flowchart of a process for operating the bias controller of FIG. 1 according to the fine tuning aspect of the present invention.

Turning to FIGS. 2A and 2B, there are depicted flowcharts for the process for operating the digital signal processor 93 during the coarse tuning aspect of the present invention.

The invention claimed is:

1. A method of operating an optical transmitter for transmission of an optical signal over a dispersive fiber optic media to a remote receiver comprising:

providing an initial bias level of a first RF signal and a second RF signal respectively to an optical modulator for modulating an optical signal input to the optical modulator;

determining the amplitude of an optical signal output of the optical modulator operating at the provided initial bias levels;

adjusting the bias level of at least one of the first and second RF signals based upon a determined output level and an expected output level at a configuration set point for the respective initial bias levels;

determining the expected output level from a lookup table based upon the provided respective initial bias levels;

adjusting the bias levels using a first software program sequence for making coarse bias adjustment on start up of the optical transmitter, and using a second software program sequence for making a fine bias adjustment;

adjusting the bias level of only one of the RF signals during the first software program sequence;

incrementing the bias level of said one RF signal during the first software program sequence and averaging the output level of the modulator over a program controlled time period;

determining whether the first RF input signal should be incremented or decremented based upon the change in the output level of the optical modulator as a result of incrementing the first RF input signal;

when the lookup table indicates the first RF signal is to be incremented, then incrementing the first RF signal by a computed delta value and comparing a resulting output to a first threshold value;

when the lookup table indicates that the first RF signal is to be decremented, then decrementing the first RF signal by the delta value until a subsequently averaged output signal exceeds the first threshold value;

determining when the subsequently averaged output signal exceeds the first threshold value then activating the second program sequence for more finely adjusting the bias level of both the first RF signal and the second RF signal;

adjusting the bias level of the first RF signal during the second program sequence if a current output value $T_i$ is greater than an immediately previous value $T_{i-1}$ or an immediately subsequent output value $T_{i+1}$ is greater than the current output value $T_i$ or if an absolute value of a difference between a second program sequence threshold value and the current output value is greater than an absolute value of a difference between the second program sequence threshold value and the subsequent output value $T_{i+1}$; and adjusting the bias level of the second RF signal during the second program sequence if a current output value $T_i$ is less than an immediately previous value $T_{i-1}$ or an immediately subsequent output value $T_{i+1}$ is greater than the current output value $T_i$ or if an absolute value of a difference between the second program sequence threshold value and the current output value is less than an absolute value of a difference between the second program sequence threshold value and the subsequent output value $T_{i+1}$.

2. An optical transmitter for transmission of an optical signal over a dispersive fiber optic media to a remote receiver comprising:

a modulator that modulates an optical signal input to the modulator with a first RF signal provided through a first RF signal input and with a second RF signal provided through a second RF input;

a respective bias level of the first RF signal and the second RF signal that is provided to the modulator through the respective first and second RF signal inputs;

a photodiode that detects an output level of the modulator in response to the provided bias levels;

a program that adjusts a bias level of at least one of the first and second RF signals based upon the detected output level and an expected output level at a configuration set point for the provided respective bias levels; and a first program that provides a first coarse bias level adjustment to the configuration set point and a second program that provides a final fine tuning bias level adjustment to the configuration set point.

3. The optical transmitter for transmission of said optical signal as in claim 2, further comprising a digital signal processor associated with memory that stores data representing said expected output level and is configured to receive a digital representation of said detected output level and in response thereto execute said programs.

4. The optical transmitter for transmission of said optical signal as in claim 3, further comprising a bias control circuit to set said respective bias levels of said first and second RF signals responsive to an output signal from said digital signal processor.

5. The optical transmitter for transmission of said optical signal as in claim 3, further comprising a pilot processor and a pilot level control circuit configured to generate pilot tones for injection into said first and second RF signals, and further including a demodulator to demodulate said pilot tones from a modulator output, to determine said digital representation of said detected output level.

6. The optical transmitter for transmission of said optical signal as in claim 3, further comprising a demodulator configured to demodulate an output from said photodiode and an analog-to-digital converter to generate said digital representation of said detected output level based on digitizing said output of said demodulator.

7. The optical transmitter for transmission of said optical signal as in claim 2, further comprising a modulation controller configured to provide said first and second RF signals to said first and second RF signal inputs of said modulator and to control said respective bias levels thereof, said modulation controller including an RF input and a signal splitter to split an RF signal into said first and second RF signals.

8. The optical transmitter for transmission of said optical signal as in claim 7, further comprising a predistortion circuit and a first bias isolator in series to couple said first RF signal to said first RF signal input of said modulator, said first bias isolator configured to apply said respective bias level to said first RF signal.

9. The optical transmitter for transmission of said optical signal as in claim 7, further comprising an attenuator, a delay line, and a second bias isolator in series to couple said second RF signal to said second RF signal input of said modulator.

10. A method of operating an optical transmitter for transmission of an optical signal over a dispersive fiber optic media to a remote receiver comprising:

obtaining a digital signal for an output optical signal from an optical modulator that is responsive to a first input signal;

determining averages of the digital signal before and after incrementing the first input signal to the optical modulator;

using the averages in a look-up table to determine whether the first input signal should be further incremented or decremented;

if the first signal is to be further incremented, incrementing the first input signal until the average of the digital signal before a last increment is below a threshold value and above the threshold value after the last increment;

if the first input signal is to be decremented, decrementing the first input signal until the average of the digital signal before a last decrement is above the threshold value and below the threshold value after the last decrement.

* * * * *